United States Patent  [15] 3,673,555
Raudsep  [45] June 27, 1972

[54] MODULATED CARRIER ACOUSTIC BEACON

[72] Inventor: Ilmar G. Raudsep, Seattle, Wash.
[73] Assignee: Honeywell Inc., Minneapolis, Minn.
[22] Filed: Oct. 23, 1970
[21] Appl. No.: 83,350

Related U.S. Application Data

[60] Division of Ser. No. 741,191, June 28, 1968, Pat. No. 3,559,161, which is a continuation-in-part of Ser. No. 655,662, July 24, 1967, abandoned.

[52] U.S. Cl. .................................340/5 R, 340/15
[51] Int. Cl. ..........................................H04b 11/00
[58] Field of Search..............340/3 R, 5 R, 15, 5 S, 16 C, 340/6 R; 343/101; 181/0.5 A, 0.5 AG, 0.5 J

[56] References Cited

UNITED STATES PATENTS 3,133,261  5/1964  Ott.............................................340/5
3,341,808  9/1967  Levin et al...................................340/5

Primary Examiner—Richard A. Farley
Attorney—Charles J. Ungemach and Charles L. Rubow

[57] ABSTRACT

An underwater beacon for transmitting an acoustic signal characterized so as to facilitate accurate determination of the position of an acoustic receiver array relative to the beacon. The beacon comprises a pair of oscillators whose output signals are supplied to a modulator which is further controlled by a timer so as to produce a periodic modulated carrier frequency signal, each period of which is made up of predetermined intervals of unmodulated carrier, modulated carrier, and silence. The output of the modulator is supplied to a driver which energizes an acoustic projector.

4 Claims, 6 Drawing Figures

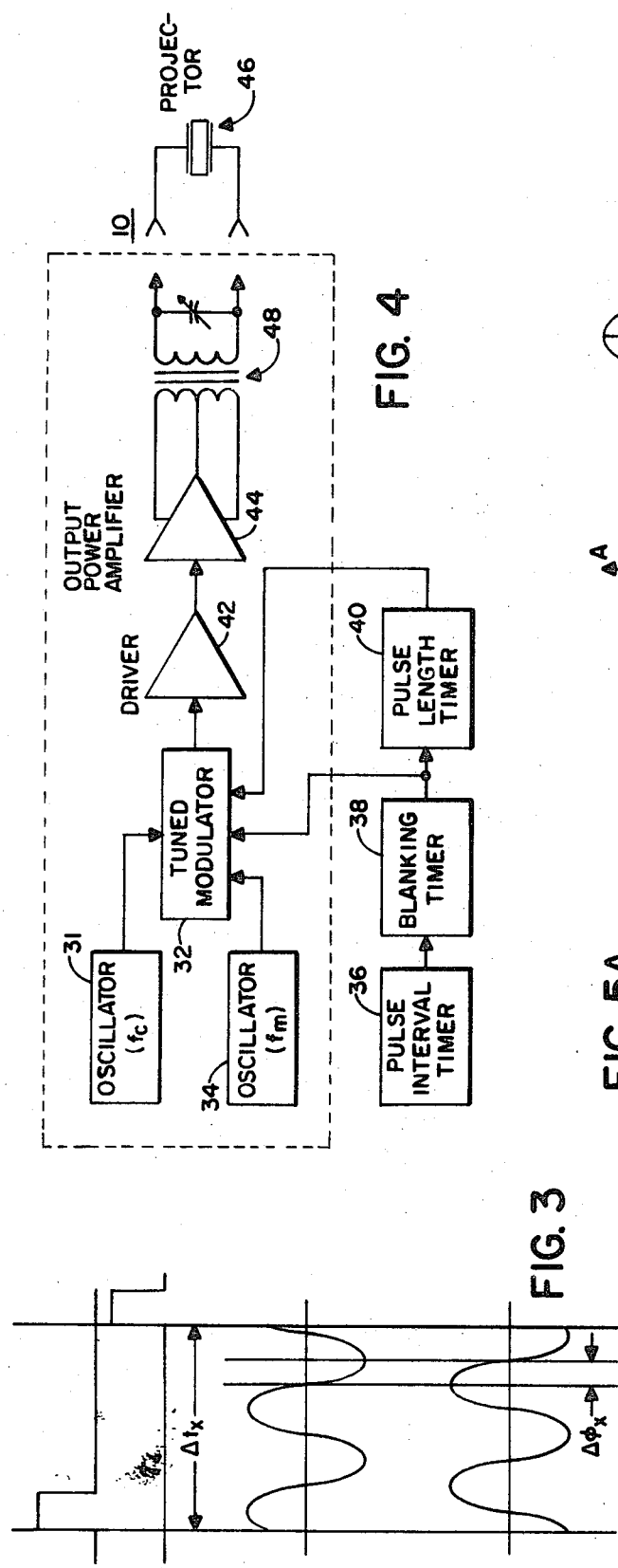

MODULATED CARRIER ACOUSTIC BEACON

CROSS REFERENCES TO RELATED APPLICATIONS

This application is a division of copending application Ser. No. 741,191, now U.S. Pat. No. 3,559,161 filed June 28, 1968 for Acoustic Position Reference System in the name of the same inventor and assigned to the same assignee as the present application. The copending application is a continuation in part of application, Ser. No. 655,662 (now abandoned) filed July 24, 1967 for Control Apparatus in the name of the same inventor and assigned to the same assignee as the present application.

BACKGROUND OF THE INVENTION

The invention herein described pertains generally to acoustic direction finding apparatus, and more specifically to a beacon for transmitting a periodic modulated carrier frequency acoustic signal.

It is generally known that the position of one object relative to another can be determined by locating a signal transmitter in a known positional relationship to one of the objects, locating spaced signal receivers in a known positional relationship to the other object, and computing the positional relationship of the objects by triangulation techniques from the difference in signal transit times between the transmitter and the individual receivers. More specifically, it is known that the angular position between a watercraft and a sonar beacon transmitting a periodic signal can be determined by mounting spaced sonar receivers on the watercraft and computing the angular positional relationships from differences in arrival times of the periodic signal at the individual sonar receivers. In prior art systems of this type, the signals used have typically been simple periodic pulses. However, as the accuracy requirements for such systems have become more stringent, it has become increasing difficult to meet the standards with apparatus employing simple pulse signals.

The accuracy problems encountered with pulse signals arise in part from the fact that it is necessary to accurately detect the arrival of the same point on a transmitted pulse at separate receivers. Considerable unpredictable distortion occurs in acoustic signals transmitted through a seawater medium in which position determining systems of the above-described type are typically used. This condition is aggrevated by the fact that the signal must generally travel along distinct paths to reach individual receivers, thus introducing the unpredictable and different signal transmission characteristics of a plurality of paths.

To overcome the accuracy limitations of prior art systems, the applicant has devised an acoustic position determining system employing a unique periodic modulated carrier signal. Each period of the signal comprises a modulated carrier frequency signal in the following modulation sequence: (1) a single short pulse of relatively high amplitude, (2) a number of cycles of sine wave modulation, and (3) an interval of silence. Further, the applicant has provided a novel acoustic signal beacon including unique signal modulation apparatus for producing the above-described acoustic signal.

Relating this invention to a specific application, the fields of ocean exploration and exploitation have produced many instances requiring precise relative location of vessels, submersibles, and bottom structures. In off shore oil drilling operations using floating platforms, it is necessary to determine the position of drilling apparatus relative to a well head so that the drilling apparatus may be properly positioned. Similarly, it may be necessary to guide a diver to the well head or other bottom structure, or to guide a submersible performing search or inspection cruises. The invention herein described facilitates the precise performance of these tasks.

SUMMARY OF THE INVENTION

The applicant's acoustic beacon basically comprises first and second oscillators whose output signals are supplied to a modulator. The signals produced by the separate oscillators are of substantially different frequencies. The modulator produces an output signal in which the higher frequency forms a carrier which is modulated by the lower frequency. A timer is connected to the modulator and periodically interrupts modulation of the higher frequency so that an interval of unmodulated carrier is periodically formed. In addition, the timer may also periodically blank the output of the modulator so that it produces a periodic output signal, each period of which comprises an interval of unmodulated carrier, an interval of modulated carrier, and an interval of silence. The signal produced by the modulator is supplied to a driver which energizes an acoustic projector. The driver may include a power amplifier and a matching transformer.

Accordingly, it is a primary object of this invention to provide apparatus for producing a unique periodic modulated carrier signal.

It is a further object of this invention to provide a novel acoustic beacon which is particularly well adapted for use in a highly accurate acoustic position determining system.

BRIEF DESCRIPTION OF THE DRAWINGS

FIG. 3 illustrates time and phase differences in corresponding signals received at a pair of hydrophones;

FIG. 4 is a block diagram of the acoustic beacon of the present invention; and

FIGS. 5A and 5B respectively illustrate the wave form of the signal transmitted by the beacon of FIG. 4 and the power spectrum thereof.

DESCRIPTION OF THE PREFERRED EMBODIMENT

Figure 2:
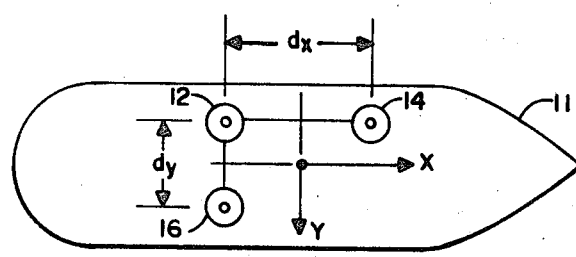
FIG. 2 illustrates one placement of hydrophones in a system for determining relative position in two perpendicular planes.
Figure 1:
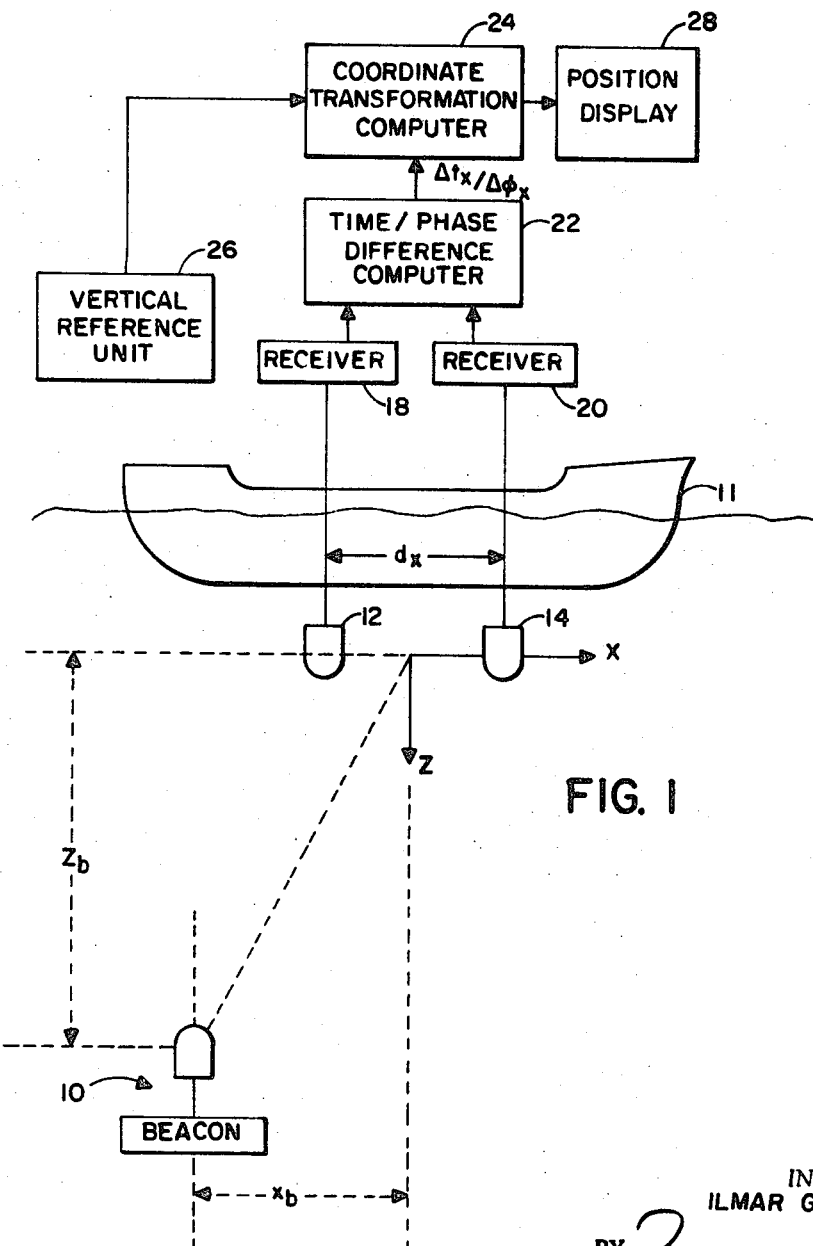
FIG. 1 is a block diagram of an acoustic position determining system employing the present acoustic beacon for determining relative position in one plane.

FIGS. 1 and 2 illustrate a system in which the applicant's unique acoustic beacon is advantageously used to facilitate precise position determination. In FIG. 1, reference numeral 10 generally identifies an acoustic beacon in accordance with the present invention. Beacon 10 is typically located at or near the bottom of a body of water in a known positional relationship to an object or point of interest (not shown). Reference numeral 11 identifies a watercraft such as a ship or oil well drilling platform. Watercraft 11 has a plurality of acoustic receivers or hydrophones 12, 14 and 16 mounted thereon in a spaced relationship as indicated in FIGS. 1 and 2. Hydrophones 12 and 14 are used in determining relative horizontal position in one direction designated as the X direction. Hydrophones 12 and 16 are used in determining relative horizontal position in a second direction designated as the Y direction. The X and Y directions are shown perpendicular, although this relationship is not required. Vertical distances are designated along the Z direction perpendicular to both the X and Y directions.

As shown in FIGS. 1 and 2, hydrophones 12 and 14 are separated by a distance $d_x$ and hydrophones 12 and 16 are separated by a distance $d_y$. The X, Y and Z directions define an orthogonal coordinate system whose origin is located at the intersection of the horizontal perpendicular bisectors of lines joining hydrophones 12 and 14, and 12 and 16. The coordinate system is fixed relative to watercraft 11. As shown in FIG. 1, the vertical distance between beacon 10 and hydrophones 12, 14 and 16 is designated as $z_b$. The distance in the X direction between beacon 11 and the origin of the coordinate system is designated as $x_b$.

To avoid complicating the description of the illustrated system in which the acoustic beacon of the present invention is used, only apparatus for determining position in the XZ plane will be described. Only this apparatus is shown in FIG. 1. The apparatus and computations used in determining position in the YZ plane are analogous to those features for determining position in the XZ plane, and need not be described in detail.

Hydrophones 12 and 14 are connected to receiver circuits 18 and 20 respectively. Receiver circuits 18 and 20 produce signals indicative of the acoustic signals detected by hydrophones 12 and 14. The signals produced by receiver circuits 18 and 20 are supplied to a time/phase difference computer 22 which produces a signal accurately indicative of the time difference $\Delta t_x$ and phase difference $\Delta \phi_x$ of a signal arriving at hydrophones 12 and 14. The time and phase difference signals are supplied to a coordinate transformation computer 24. Computer 24 also receives signals from a vertical reference unit 26 which senses deviations from horizontal of the plane containing hydrophones 12, 14 and 16. Such deviations may occur as a result of pitching and rolling of the watercraft. Coordinate transformation computer 24 computes relative horizontal position as a fraction of $z_b$ from time and phase differences the received signals. The computed relative horizontal position is then converted to appropriate position display signals which are supplied to a position display 28.

In order to simplify description of the system in which the beacon of the present invention is used, it will be assumed that hydrophones 12, 14 and 16 remain in a horizontal plane. This may be achieved with a stabilized watercraft which does not roll or pitch; or the mounting for the hydrophones may be stabilized independently of the watercraft on which it is mounted. In a more typical system, corrections for deviations of the hydrophones from a horizontal plane may be relatively easily introduced in the time/phase difference or coordinate transformation computers.

The time difference $\Delta t_x$ and phase difference $\Delta \phi_x$ of a signal arriving at hydrophones 12 and 14 can be visualized by reference to FIG. 3. The time difference $\Delta t_x$ is the difference in arrival times at hydrophones 12 and 14 of the pulse portion of the signal transmitted by beacon 10. The phase difference $\Delta \phi_x$ is the difference in phase at hydrophones 12 and 14 of the modulated portion of the signal transmitted by beacon 10. The pulse portion of the signal is utilized in the system shown in FIG. 1 to obtain an approximate or coarse indication of the difference in signal transit times between beacon 10 and hydrophones 12 and 14. The coarse measurement is accurate to within one cycle of the measurement derived from the modulated portion of the signal. Information derived from the modulated portion of the signal is utilized to produce a fine measurement which is combined with the coarse measurement to provide an accurate, wide range phase difference determination.

The foregoing description of the system shown in FIG. 1 provides an adequate background against which the structural and operational features of the applicant's beacon can be viewed. The structure and operation of the complete system are covered in detail in parent applications, Ser. Nos. 655,662 and 741,191.

Attention is now directed to FIG. 5 which shows the details of beacon 10. An oscillator 31 produces a signal having a frequency $f_c$ which is supplied to a first input of a tuned modulator 32. A second oscillator 34 produces a signal having a frequency $f_m$ which is supplied to a second input of modulator 32. A pulse interval timer 36 supplies a signal through a blanking timer 38 to a third input of modulator 32. The signal from blanking timer 38 is also supplied to a pulse length timer 40 which supplies a signal to a fourth input of modulator 32. The output of modulator 32 is supplied through a driver 42 to a power amplifier 44. Amplifier 44 energizes an acoustic projector 46 through a transformer 48.

It will be noted that power supplies have been omitted from the apparatus shown in FIGS. 1 and 4. The apparatus mounted on watercraft 11 will typically be powered from a central source on the watercraft. The beacon of FIG. 4 typically contains a battery or other portable power source for powering the various electrical components and subcircuits therein.

Referring to FIG. 5A, the periodic waveform of the signal produced by beacon 10 is formed in three time intervals. The signal during the first time interval designated as $T_1$ comprises a pulse of unmodulated signal from oscillator 31 having a frequency $f_c$. The signal during the second time interval designated as $T_2$ comprises a modulated signal in which the signal having a frequency $f_c$ from oscillator 31 is modulated by the signal having frequency $f_m$ from oscillator 34. The signal during the third time interval designated as $T_3$ comprises an interval of silence where the output of modulator 32 is blanked by means of a signal from blanking timer 38. As illustrated in FIG. 5B, the output signal from beacon 10 has a center frequency of $f_c$ during time $T_1$. During time $T_2$, the output signal is characterized by predominant difference and sum frequencies $f_c - f_m$ and $f_c + f_m$.

As previously indicated, beacon 10 produces a signal whose characteristics are uniquely adapted to permit accurate measurement of the difference in transit times of the signal from beacon 10 to hydrophones 12 and 14. Specifically, pulse length timer 40 generates a signal of duration $T_1$, which when applied to modulator 32, results in a pulse of output signal at frequency $f_c$. To provide maximum output power during this pulse, modulator 32 is designed to provide a peak signal level of approximately one and one half times the peak level of the signal side band signal transmitted during interval $T_2$.

At the conclusion of interval $T_1$, a time interval $T_2$ determined by pulse interval timer 136 is initiated and transmission of a double side band signal for the duration of interval $T_2$ begins. During interval $T_2$, oscillators 31 and 34 provide signals at relatively high and relatively low frequencies ($f_c$ and $f_m$) to first and second inputs respectively of modulator 32. Modulator 32 operates as a conventional double balanced modulator and the output signal is characterized by predominant frequency components at frequencies $f_c - f_m$ and $f_c + f_m$. During this time interval, modulator 32 substantially completely suppresses any signal at frequency $f_c$.

At the end of time interval $T_2$, blanking timer 38 generates a blanking pulse of duration $T_3$. The length of the blanking pulse is determined by circuit constants in the blanking timer. During interval $T_3$, blanking timer 38 applies a signal to modulator 32 which cuts off any output signal from the modulator. Thus, no output signal is transmitted from projector 46 during this time interval. At the conclusion of interval $T_3$, a new interval $T_1$ begins. The period of the total periodic signal is designed as $T_4$ in FIG. 5A.

Although any suitable frequencies may be used, oscillators 31 and 34 in one satisfactory embodiment were designed to produce signals at 40 KHz and 720 Hz respectively. In addition, time intervals of the following durations were used.

$T_1 = 1.6$ milliseconds
$T_2 = 78.8$ milliseconds
$T_3 = 5$ milliseconds

The signal produced by modulator 32 is amplified by driver 42 and amplifier 44. The signal produced by amplifier 44 is transmitted through transformer 48, which performs an impedance matching function, to acoustic projector 46. Projector 46 converts the electrical signal into an acoustic signal for transmission through the seawater medium to the hydrophones shown in FIGS. 1 and 2. Transducer 46 basically operates as a semi-directional source, transmitting a signal of relatively uniform level in all upward directions.

As is apparent from the preceding discussion, the applicant's unique acoustic beacon produces (1) a short pulse at a single frequency, (2) an interval of signal at two precisely spaced single frequency components, and (3) an interval of silence. This signal has been found to have characteristics which make it particularly well suited for use in a highly accurate acoustic position reference system. Although a specific embodiment of apparatus for producing the specified signal is shown for illustrative purposes, other embodiments which do not depart from the applicant's contemplation and teaching will be apparent to those skilled in the art. The applicant does not wish to be limited to the disclosed embodiment, but only by the terms of the appended claims.

I claim:

1. An acoustic beacon for transmitting a periodic amplitude modulated signal comprising:

modulator means operable to produce a signal characterized by a first frequency amplitude modulated by a second frequency;

timer means connected to said modulator means and operable to periodically interrupt modulation of the first frequency so that said modulator means produces a periodic output signal, each period of which comprises a first interval of the first frequency followed by a second interval of the first frequency modulated by the second frequency;

acoustic projector means; and driving means connected to said modulator means and said acoustic projector means so as to energize said acoustic projector means in response to the periodic output signal.

2. The beacon of claim 1 wherein said timer means includes means for periodically blanking the output of said modulator means so that each period of the output signal produced thereby includes a third interval of silence, whereby said acoustic projector is caused to transmit a periodic acoustic signal in which each period successively comprises a first interval of the first frequency, a second interval of the first frequency modulated by the second frequency and a third interval of silence.

3. Signal modulation apparatus for use in an acoustic beacon comprising:

a first oscillator for producing a first signal having a frequency $f_1$;

a second oscillator for producing a second signal having a frequency $f_2$;

a modulator connected to said first and second oscillators so as to receive the first and second signals therefrom, said modulator being operable to produce a modulated signal whose predominant frequency components are $f_1 - f_2$ and $f_1 + f_2$; and timer means connected to said modulator for periodically interrupting modulation of the first signal, whereby said modulator produces a periodic output signal, each period of which comprises a first interval of signal whose frequency is $f_1$ followed by a second interval of signal whose predominant frequency components are $f_1 - f_2$ and $f_1 + f_2$.

4. The apparatus of claim 3 wherein said timer means is operable to periodically blank the signal produced by said modulator so that each period of the modulated signal includes a third interval of silence.

* * * * *